(12) United States Patent
Venkumahanti et al.

(10) Patent No.: US 7,979,681 B2
(45) Date of Patent: Jul. 12, 2011

(54) SYSTEM AND METHOD OF SELECTIVELY ACCESSING A REGISTER FILE

(75) Inventors: Suresh K. Venkumahanti, Austin, TX (US); Lucian Codrescu, Austin, TX (US); Shankar Krithivasan, Austin, TX (US); Jian Shen, Austin, TX (US); Lin Wang, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 11/943,190

(22) Filed: Nov. 20, 2007

(65) Prior Publication Data

US 2009/0132793 A1   May 21, 2009

(51) Int. Cl.
*G06F 9/00* (2006.01)
(52) U.S. Cl. ............................ 712/225; 712/223
(58) Field of Classification Search ............... 712/223, 712/225
See application file for complete search history.

(56) References Cited

U.S. PATENT DOCUMENTS

| | | | | |
|---|---|---|---|---|
| 3,454,929 A * | 7/1969 | Hynes | | 715/210 |
| 4,247,891 A * | 1/1981 | Flynn et al. | | 712/223 |
| 4,276,607 A * | 6/1981 | Wong | | 708/628 |
| 4,748,575 A * | 5/1988 | Ashkin et al. | | 708/211 |
| 5,091,874 A * | 2/1992 | Watanabe et al. | | 708/211 |
| 5,742,538 A * | 4/1998 | Guttag et al. | | 708/620 |
| 5,968,165 A | 10/1999 | Hansen | | |
| 6,173,300 B1 * | 1/2001 | Mahurin | | 708/211 |
| 6,256,715 B1 * | 7/2001 | Hansen | | 711/163 |
| 6,381,622 B1 * | 4/2002 | Lie | | 708/211 |
| 6,745,336 B1 | 6/2004 | Martonosi et al. | | |
| 6,948,051 B2 | 9/2005 | Rivers et al. | | |
| 2003/0146858 A1 * | 8/2003 | Chen et al. | | 341/63 |
| 2007/0220023 A1 * | 9/2007 | Dean et al. | | 707/101 |
| 2009/0276432 A1 * | 11/2009 | Hokenek et al. | | 707/9 |

FOREIGN PATENT DOCUMENTS

WO    2006071385    7/2006

OTHER PUBLICATIONS

Canal R et al: "Very Low Power Pipelines Using Significance Compression" Proceedings of the Annual International Sympsium Onmicroarchitecture, (Dec. 10, 2000), pp. 181-190.
International Search Report—PCT/US08/084181, International Search Authority—European Patent Office—Feb. 9, 2009.

(Continued)

*Primary Examiner* — Idriss N Alrobaye
(74) *Attorney, Agent, or Firm* — Peter M. Kamarchik; Nicholas J. Pauley; Jonathan T. Velasco

(57) ABSTRACT

In a particular embodiment, a method is disclosed that includes identifying a first block of bits within a result to be written to a destination register by an execution unit. The result includes a plurality of bits having the first block of bits and a second block of bits. The first block of bits has a value of zero. The method further includes providing an encoded bit value representing the first block of bits to a control register and selectively writing the second block of bits, but not the first block of bits, to the destination register. The destination register is sized to receive the first and second blocks of bits.

21 Claims, 8 Drawing Sheets

OTHER PUBLICATIONS

Kucuk G et al: "Energy-Efficient Instruction Dispatch Buffer Design for Superscalar Processors" Proceedings of the 2001 International Symposium on Low Power Electronics and Design, ISLPED. Huntington Beach, CA, Aug. 6-7, 2001; [International Symposium on Low Power Electronics and Design], New York, NY: ACM, US, (Aug. 6, 2001), pp. 237-242.

Written Opinion—PCT/US08/084181, International Search Authority—European Patent Office—Feb. 9, 2009.

* cited by examiner

SYSTEM AND METHOD OF SELECTIVELY ACCESSING A REGISTER FILE

I. FIELD

The present disclosure is generally related to a system and method of selectively writing to a register file.

II. DESCRIPTION OF RELATED ART

In general, modern processors are adapted to perform a wide variety of numeric calculations. Typically, such calculations are performed on operands. In many instances, such operands include a large number of zeros. For example, in graphics processing, the operands may be sixty-four bits each, but a large portion of the sixty-four bits may be zeros. In some instances, upper bits (i.e., most significant bits) of a result to be written to a register may be zeros for a significant percentage of write operations. Thus, the processors may perform the numeric calculations on all of the bits, but only a portion of the sixty-four bits, such as on 8 bits of the sixty-four bits, results in a value other than zero. However, writing a result, even a zero value result, to a register file consumes power.

III. SUMMARY

In a particular embodiment, a method is disclosed that includes identifying a first block of bits within a result to be written to a destination register. The result includes a plurality of bits having the first block of bits and a second block of bits. The first block of bits has a value of zero. The method further includes selectively writing the second block of bits, but not the first block of bits, to the destination register. Each of the first and second block of bits may be a group or set of bits having a specified size or corresponding to a specified portion of a data word or register, and may correspond to any number of bits, such as 8 bits, 16 bits, 32 bits, or any other number of bits as may be determined by performance goals, system design constraints, or other factors.

In another particular embodiment, a circuit device is disclosed that includes an execution unit to process instructions and to generate a result having a plurality of bits. The circuit device also includes a destination register to store selected bits of the plurality of bits and a logic circuit having access to the execution unit and to the destination register. The logic circuit is adapted to receive the result from the execution unit and to selectively write non-zero value blocks of data bits to the destination register. The logic circuit stores an encoded value identifying the zero value blocks of data bits and the non-zero blocks of data to a control register. In an illustrative embodiment, the encoded value may identify each block of zero value data bits with a corresponding "zero" encoded value and may also identify each block of data bits including at least one non-zero value bit with a corresponding "one" value.

In still another particular embodiment, a method is disclosed that includes generating a result to be written to a destination register at an execution unit of a processor. The result includes a plurality of granules, where each granule of the plurality of granules has a plurality of bits. The method further includes identifying one or more granules comprising non-zero value bits from the plurality of granules and selectively writing the identified one or more granules, but not the others of the plurality of granules, to the destination register.

In yet another particular embodiment, a processor is disclosed that includes a means for identifying a first block of bits within a result to be written to a destination register. The result includes a plurality of bits including the first block of bits and a second block of bits, where the first block of bits has a value of zero. The processor also includes a means for providing an encoded bit value representing the first block of bits and the second block of bits to a control register. The processor further includes a means for selectively writing the second block of bits to a second portion of the destination register, but not writing the first block of bits to a first portion of the destination register.

One particular advantage provided by embodiments of the circuit device adapted to prevent writing of blocks of zero values to a destination register is that overall power consumption may be reduced. By selectively writing only non-zero blocks of bits to the register file, power dissipation may be reduced at the register file due to capacitive effects during switching of long wires.

Another particular advantage is provided in that a register file may be partitioned to support fractional-width read and write operations. For example, a register file having 32-bits may be partitioned to allow read and write operations of 16 bits, 8 bits, four bits, and so on. In this instance, non-zero blocks of data may be written to a selected portion of the register file without writing zero value blocks of data to the register file. In this example, portions of the register file may also be accessed to read the non-zero value portion from the register file, without accessing other portions of the register file. By partitioning the register file, a control unit may skip read/write operations related to zero-value blocks of data bits, conserving power.

In still another particular embodiment, an additional advantage is provided in that a data buffer may be provided within a register file, within a control unit, or elsewhere within a circuit device to selectively store register data at a data buffer or latch according to a bit mask, such that zero value blocks of data are not stored in the data buffer or latch (i.e., are not read out of the register file). In a particular embodiment, the data latch may be internal to the register file and thus a read enable line may be powered only from the register to the data latch. By not updating the data latch to store zero value blocks of data, overall power consumption for data lines driven from the data latch to an execution unit is reduced.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
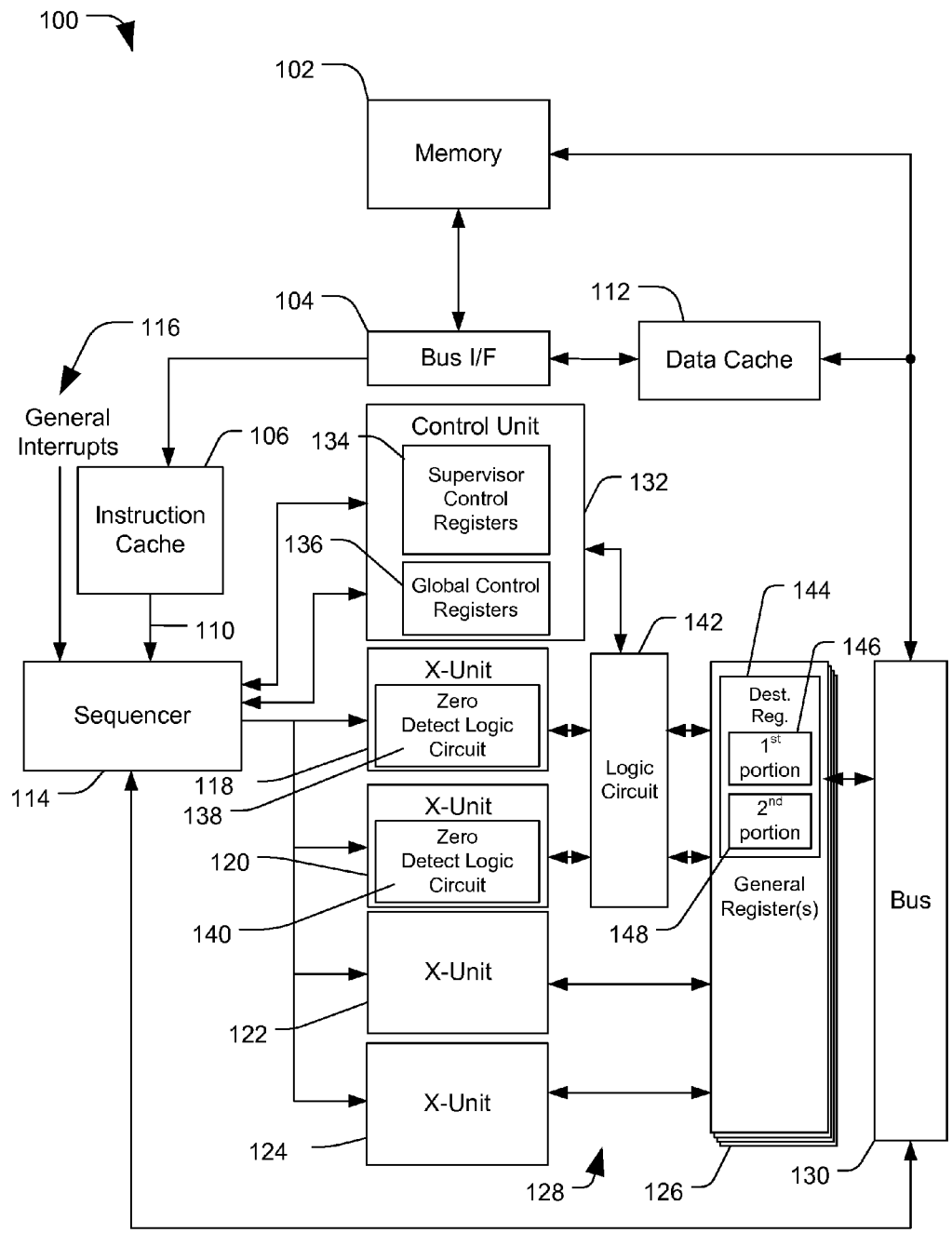
FIG. 1 is a block diagram of a particular illustrative embodiment of a circuit device including zero detect circuitry and logic circuitry to selectively access a destination register.

FIG. 1 is a block diagram of a particular illustrative embodiment of a circuit device 100 including zero detect circuitry and logic circuitry to selectively access a destination register. The processing system 100 includes a memory 102 that is adapted to communicate with an instruction cache 106 and a data cache 112 via a bus interface 104. The instruction cache 106 is coupled to a sequencer 114 by a bus 110. The processing system 100 may also include a control unit 132 having supervisor control registers 134 and global control registers 136 to store bits that may be accessed by control logic within the sequencer 114 to determine whether to accept interrupts, such as the general interrupts 116, and to control execution of instructions.

In a particular embodiment, the instruction cache 106 is coupled to the sequencer 114 via a plurality of current instruction registers, which may be coupled to the bus 110 and associated with particular threads of the processing system 100. In a particular embodiment, the processing system 100 is an interleaved multi-threaded processor.

The sequencer 114 is coupled to a first instruction execution unit 118, a second instruction execution unit 120, a third instruction execution unit 122, and a fourth instruction execution unit 124. Each instruction execution unit 118, 120, 122, and 124 can be coupled to a general register file 126 via a second bus 128. The general register file 126 can also be coupled to the sequencer 114, the data cache 112, and the memory 102 via a third bus 130.

The first execution unit 118 includes a zero detect logic circuit 138, and the second execution unit 120 includes a zero detect logic circuit 140. In a particular embodiment, each of the execution units 118, 120, 122 and 124 may include a zero detect logic circuit. In another particular embodiment, any one or more of the execution units 118, 120, 122, and 124 may include a zero detection logic circuit. The circuit device 100 also includes a logic circuit 142 that is coupled to the first and second execution units 118 and 120 and to the general register file 126. The general register file 126 includes a destination register 144 having a first portion 146 and a second portion 148. In a particular example, the destination register 144 may be a 32-bit register file that includes an upper bit portion (i.e., a most significant bit portion), such as the first portion 146, and a lower bit portion (i.e., a least significant bit portion), such as the second portion 148. In another particular embodiment, the destination register 144 may include four 8-bit portions.

In a particular embodiment, the first execution unit 118 receives an instruction and calculates a result to be written to the destination register 144. The result includes multiple bits including a first block of bits and a second block of bits. The zero detect logic circuit 138 within the first execution unit 118 determines that the first block of bits has a value of zero (i.e., each bit of the first block of bits is a zero) and the second block of bits has a non-zero value (i.e., at least one bit of the second block of bits is non-zero). The execution unit 118 provides the result and an indicator associated with the determination to the logic circuit 142. The logic circuit 142 selectively writes the second block of bits to the second portion 148 of the destination register 144 (i.e., the logic circuit 142 selectively writes the second block of bits, but not the first block of bits, to the destination register 144). The logic circuit 142 also generates a bit mask or encoded data values representing the first block of bits and the second block of bits and provides the bit mask to the control unit 132 for storage at the global control registers 136.

In a particular example, the logic circuit 142 may retrieve the bit mask from the global control registers 136 and utilize the bit mask to retrieve the second block of bits from the second portion 148 of the destination register 144 and to mask data retrieved from the first portion 146 of the destination register 144. For example, an AND operation may be performed on a zero bit value from the bit mask and the data from the first portion 146 to recreate the first block of bits, which may be provided to the first execution unit 118 with data from the second portion 148 of the destination register 144 for use in executing an instruction.

In another particular example, the logic circuit 142 may retrieve the bit mask from the global control registers 136 and utilize the bit mask to selectively enable a read line associated with the second portion 148 of the destination register 144 without toggling a read line associated with the first portion 146 of the destination register 144. In still another particular example, the logic circuit 142 may use the bit mask to selectively control data latching by controlling clock input signals to the latches. For example, the logic circuit 142 may retrieve the bit mask from the global control registers 136 and utilize the bit mask to selectively toggle a first clock or clock input signal associated with a first data latch coupled to the first portion 146 and to selectively toggle a second clock or clock input signal associated with a second data latch coupled to the second portion 148 to selectively latch data from the destination register 144 into the first data latch or the second data latch (such as the first and second data latches 232 and 234 illustrated in FIG. 2).

In a particular example, the logic circuit 142 can cooperate with the control unit 132 to selectively write non-zero value blocks of data bits to the destination register 144 and to prevent zero value blocks of data bits from being written to the destination register 144. By selectively writing non-zero value blocks of data bits, but not zero-value blocks of data bits, power consumption due to register write operations may be reduced. Additionally, the logic circuit 142 can cooperate with the control unit 132 to control read operations to selectively read data from portions 146 or 148 of the destination register 144 without reading the entire destination register 144. In a particular example, by reading the first portion 146, but not the second portion 148, of the destination register 144, overall power consumption due to driving data values via data lines from the destination register 144 may be reduced.

Figure 2:
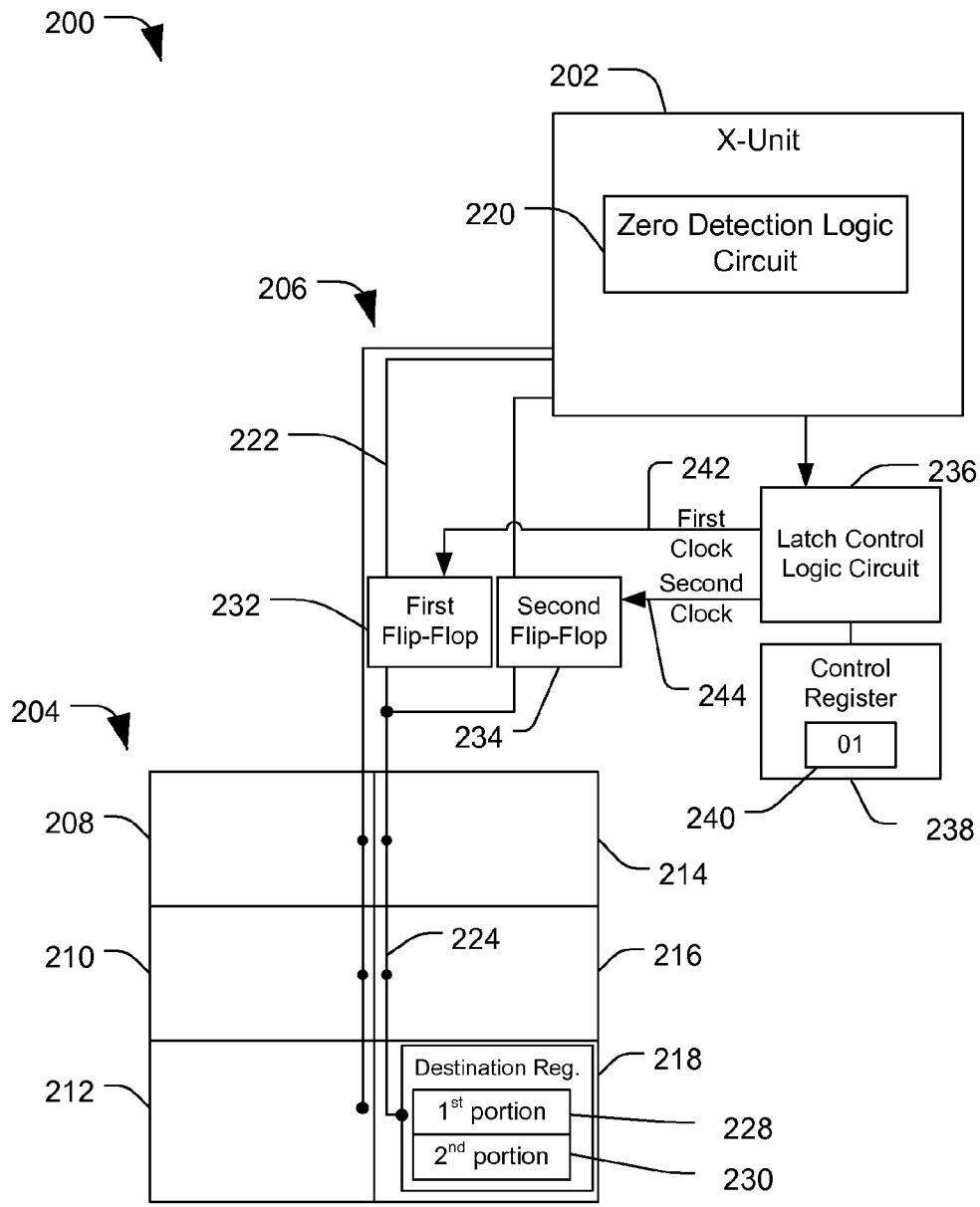
FIG. 2 is a block diagram of a particular illustrative embodiment of a circuit device including an execution unit with read/write selection control circuitry to selectively access a destination register.

FIG. 2 is a block diagram of a particular illustrative embodiment of a circuit device 200 including an execution unit with read/write selection control circuitry to selectively access a destination register. The circuit device 200 includes an execution unit 202 that communicates with a register file 204 via one or more lines 206. The register file 204 may include one or more registers 208, 210, 212, 214, 216, and 218. In a particular example, the register 218 is a destination register that includes a first portion 228 and a second portion 230. The first portion 228 may represent an upper portion of the destination register 218 (such as a block of most significant bits) and the second portion 230 may represent a lower portion of the destination register (such as a block of least significant bits). While the destination register 218 is illustrated as having a first portion 228 and a second portion 230, it should be understood that the destination register 218 may be subdivided into any number of portions. Each portion of the destination register 218 may be represented by a bit of a bit mask, such as a bit mask 240, stored in a control register 238.

The execution unit 202 includes a zero detection logic circuit 220 to determine when a result includes a contiguous block of zeros. For example, if a result is a 32-bit result, the zero detection logic circuit 220 is adapted to identify a first block of zeros, such as a 4-bit block, an 8-bit block, or a 16-bit block of zeros within the result. The result may also include a second block of data that has a non-zero value. The execution unit 202 is adapted to selectively write the second block of data, but not the first block of data, to the destination register 218 of the register file 204. In a particular example, the execution unit 202 is adapted to write the second block of data to the second portion 230 of the destination register 218. The first portion 228 may remain unchanged during the write operation.

The circuit device 200 also includes a latch control logic circuit 236, the control register 238 and a data buffer including a first flip-flop 232 and a second flip-flop 234, which are coupled to the execution unit 202 via a bus 222 and to the destination register 218 via a bus 224. While the first and second flip-flops 232 and 234 are illustrated as being external to the register file 204, it should be understood that the flip-flops 232 and 234 may also be internal to the register file 204, thereby shortening a length of wiring connecting the destination register 218 to the first and second flip-flops 232 and 234, for example. Reducing the length of the wire that is powered during a read or write operation may reduce overall power dissipation.

In a particular illustrative embodiment, the latch control logic circuit 236 is adapted to detect a register read operation from the execution unit 202 and to retrieve the bit mask 240 from the control register 238 that is related to the particular register (e.g., the destination register 218). The latch control logic circuit 236 is adapted to selectively apply a first clock signal 242 to latch data from the first portion 228 of the destination register 218 to the first flip-flop 232, a second clock signal 244 to latch data from the second portion 230 of the destination register 218 to the second flip-flop 234, or any combination thereof. In this example, data may be read from the destination register 218 and selectively captured at the data buffer (i.e., the first flip-flop 232 and the second flip-flop 234) based on the bit mask 240. For example, a bit mask 240 that includes a value of "01" may indicate that data is stored in a lower portion of the destination register 218 (e.g., the second portion 230), but that data in the upper portion (e.g., the first portion 228) may be ignored.

In a particular example, the latch control logic circuit 236 may utilize the zero bit of the mask 240 to hold a logic value of the first clock 242 at a constant level while toggling the second clock 244 based on the logic high bit of the mask 240. Thus, data stored at the second portion 230 of the destination register 218 may be latched into the second flip-flop 234 in response to providing power to the read line associated with the second portion 230 and in response to toggling the second clock signal 244. The data at the second flip-flop 234 may be provided to the execution unit 202 and the first flip-flop 232 may provide a zero value to the execution unit 202 for use in executing an instruction.

In a particular embodiment, the data buffer (i.e., the first flip-flop 232 and the second flip-flop 234) may be included within the register file 204. In another particular embodiment, the data buffer may be external to the register file 204. In a third particular embodiment, the first flip-flop 232 and the second flip-flop 234 may be within a control unit or within the execution unit 202. By utilizing the first flip-flop 232 and the second flip-flop 234 to selectively latch data, data may be selectively retrieved from the destination register 218 without extra read/write lines and without concern that unknown data may be read from a portion of the destination register. The latch control logic circuit 236 may be included in a shared control unit and may provide selective read/write functionality for multiple execution units.

Figure 3:
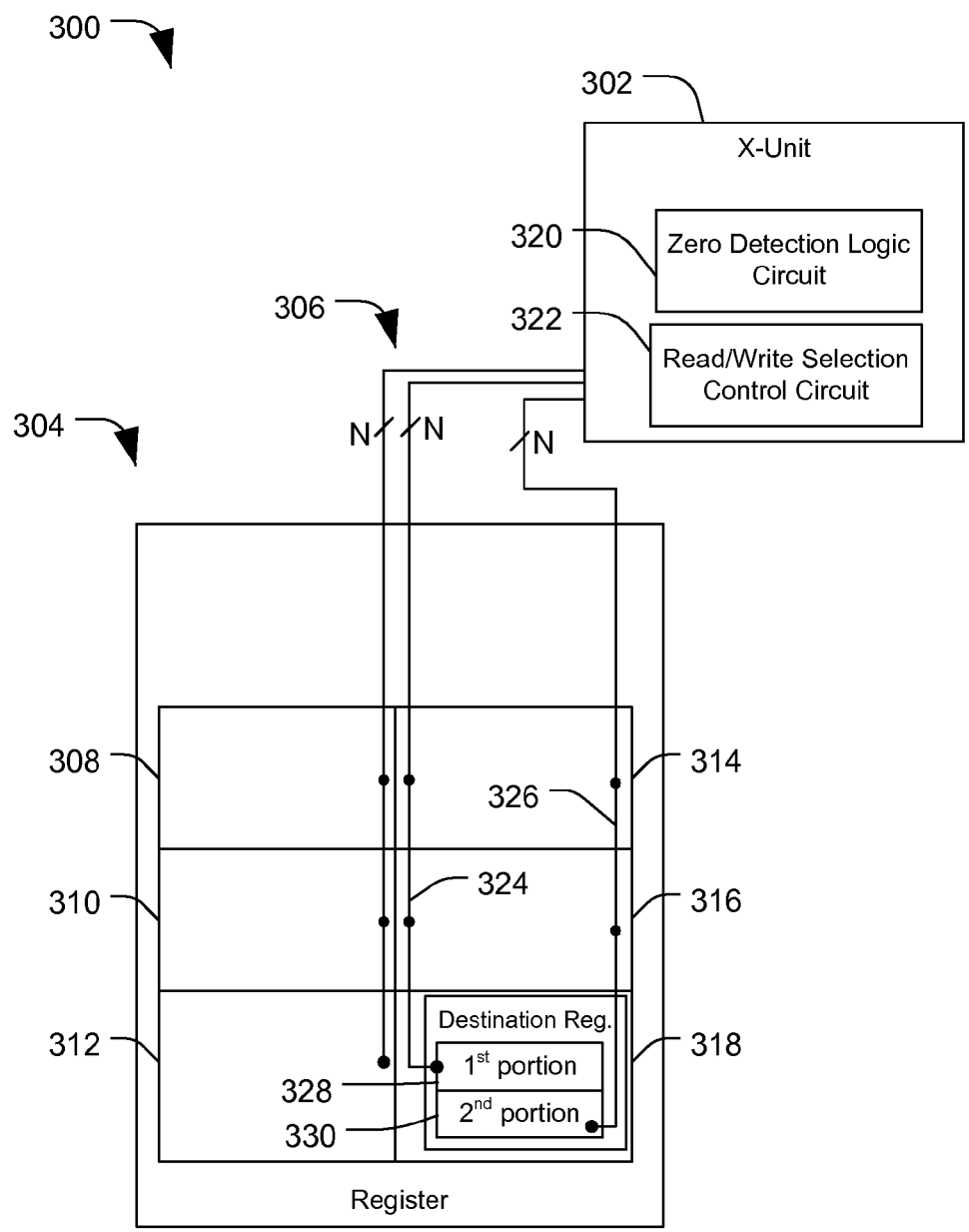
FIG. 3 is a block diagram of a second particular illustrative embodiment of a circuit device including an execution unit with read/write selection control circuitry to selectively access a destination register.

FIG. 3 is a block diagram of a second particular illustrative embodiment of a circuit device 300 including an execution unit 302 with read/write selection control circuitry 322 to selectively access a register, such as a destination register 318. The execution unit 302 communicates with a register file 304 via one or more buses, generally designated at 306. The register file 304 includes registers 308, 310, 312, 314, and 316, and the destination register 318. In this example, a first line 324 and a second line 326 may be provided to allow the execution unit 302 to selectively access a first portion 328 and/or a second portion 330 of the destination register 318. To read data from the first portion 328, the first line 324 may be toggled. To read data from the second portion 330, the second line 326 may be toggled. To read data from both the first and second portions 328 and 330, both of the first and second lines 324 and 326 may be toggled.

In a particular example, the execution unit 302 generates a result including a plurality of granules, where each granule includes multiple bits. The zero detection logic circuit 320 is adapted to identify granules of the plurality of granules that have a value of zero (i.e., all of the bits of the identified granule are equal to zero). In a particular example, a granule represents a block of bits such as four, eight, or sixteen bits of a 32-bit result. The execution unit 302 uses the read/write selection control circuit 322 to selectively write non-zero value granules of the plurality of granules to a selected portion of the destination register 318. For example, the zero detection logic circuit 320 may identify a first granule or block of bits of the result that has a value of zero and a second granule or block of bits of the result that has a value that is not equal to zero. The execution unit 302 utilizes the read/write selection control circuit to selectively activate the second line 326, but not the first line 324, to selectively write the second granule to the second portion 330 of the destination register 318, without writing the first granule to the first portion 328 of the destination register 318.

In another particular example, the first and second lines 324 and 326 may be used to access the destination register 318 to selectively read one or both of the first portion 328 and the second portion 330. By selectively controlling power to the first and second lines 324 and 326, overall power consumption may be reduced.

Figure 4:
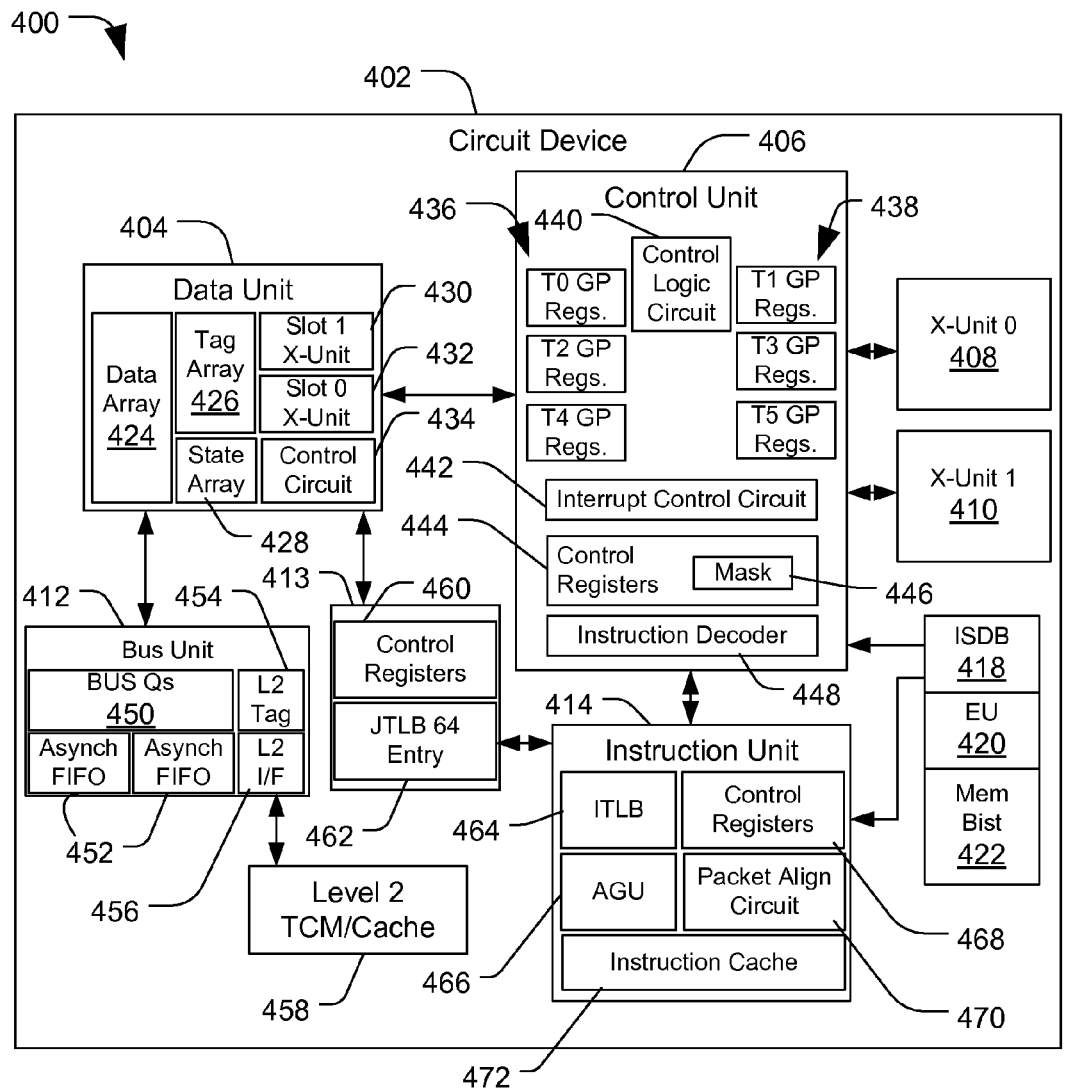
FIG. 4 is a block diagram of a particular illustrative embodiment of a circuit device including a control unit to selectively access a destination register.

FIG. 4 is a block diagram of a particular illustrative embodiment of a system 400 including a circuit device 402 having a control unit 406 to selectively access portions of a register file. In general, the circuit device 402 includes a data unit 404, which communicates with the control unit 406, with a bus unit 412, and with a joint translation look-aside buffer (TLB) unit 413. The bus unit 412 communicates with a level 2 tightly coupled memory (TCM)/cache memory 458. The control unit 406 also communicates with a first execution unit 408, a second execution unit 410, an instruction unit 414, and an in-silicon debugger (ISDB) unit 418. The instruction unit 414 communicates with the joint TLB unit 413 and with the ISDB unit 418. The circuit device 402 also includes an embedded trace unit (EU) 420 and a memory built-in self-test (BIST) or design for testability (DFT) unit 422. The ISDB unit 418, the EU 420 and the memory BIST unit 422 provide a means for testing and debugging software operating at the circuit device 402.

The data unit 404 includes a data array 424 that contains cacheable data. In a particular embodiment, the data array 424 may be a multi-way data array arranged in 16-sub-array memory banks with each bank including 16 sets of 16 ways. Each memory location within the sub-array is adapted to store a double word or 8 bytes of data. In a particular example, the sub-array can contain 256 double words (i.e., 16×16 data bits). The data unit 404 also includes a tag array 426 to store physical tags associated with the data cache. In a particular embodiment, the tag array 426 is a static random access memory (SRAM). The data unit 404 also includes a state array 428 adapted to store a status associated with a cache line. In a particular example, the state array 428 supplies a cache way for replacement in response to a cache miss event. The data unit 404 also includes an execution unit (slot 1) 430 and an execution unit (slot 2) 432, which generally perform load and store operations. The data unit 404 includes a control circuit 434 to control the operation of the data unit 404.

In general, the data unit 404 communicates with the control unit 406 to receive instructions for execution at the execution units 430 and 432. The data unit 404 also communicates with the bus unit 412 for bus service requests and with the joint TLB unit 413 for joint TLB-main memory unit translations.

The control unit 406 includes register files 436 and 438, a control logic circuit 440, an interrupt control circuit 442, control registers 444, and an instruction decoder 448. The control registers 444 may store a mask 446, which may include two or more bits representing an encoded version of a result that was provided by an execution unit 408 or 410 to one of the general registers 436 or 438. In general, the control unit 406 schedules threads and requests instructions from the Instruction Unit (IU) 414, and decodes and issues them to three execution units: the data unit 404 (execution slots 1 and 0, 430 and 432 respectively), the execution unit 408, and the execution unit 410. The control unit 406 collects the results and selectively writes the results to the register files 436 and 438. In a particular example, the control logic circuit 440 is adapted to receive a result and an encoded bit value representing blocks of zero and non-zero bits. The control logic circuit 440 is adapted to selectively write non-zero value blocks of bits, but not zero value blocks of bits, to a register file, such as the register file 436 (e.g., T0 General Purpose Register). The encoded bit value may be stored as the mask 446, such as a bit mask, within the control registers 444.

The instruction unit 414 includes an instruction translation look-aside buffer (ITLB) 464, an instruction address generation unit 466, instruction control registers 468, an instruction packet align circuit 470 and an instruction cache 472. Instruction Unit (IU) 414 can be a front end of a processor pipeline that is responsible for fetching instructions from main memory or from the instruction cache 472 and for providing the fetched instructions to the control unit 406.

The bus unit 412 includes a bus queue unit 450, a level 2 tag array 454, asynchronous first-in first-out (FIFO) units 452, and a level 2 interface 456. The level 2 interface 456 communicates with the level 2 TCM/cache 458. The joint TLB unit 413 includes control registers 460 and a joint TLB table including 64 entries 462.

In a particular illustrative embodiment, the control unit 406 receives a result from one of the execution units 430, 432, 408 and 410. The control unit 406 may detect blocks of bits having a zero value within the result. For example, the control unit 406 may detect a first 8-bits or a first 16-bits (i.e., most significant or upper bits) of the result having all zero value bits. In this instance, the control unit 406 may prevent a write operation of the zero value bits to the register files 436 and 438. The control unit 406 may encode the blocks of bits by generating a bit mask representing blocks of all zeros and blocks having non-zero values and may store the mask 446 at the control registers 444. Additionally, the control unit 406 may store blocks of bits having non-zero bit values at one of the register files 436 and 438.

In a particular example, upon receiving a request to access a register file, the control unit 406 identifies a corresponding mask 446 at the control registers 444 that corresponds to the particular register file. The control unit 406 may utilize the mask 446 to selectively toggle read lines of the particular register file, such as the register file 436 (e.g., T0 General Purpose Register) to read selected data from the selected register. In a particular embodiment, the control unit 406 may read data from the selected register and may selectively clock one or more latch circuits (such as the first and second flip-flops 232 and 234 illustrated in FIG. 2) to store the read data at a buffer. In a particular example, a portion of a register file may be read from or written to without reading from or writing to another portion of the register file. The control unit 406 may utilize the mask 446 to determine which portion of the register file to read or to determine which data latch to toggle. In another particular embodiment, the control unit 406 may toggle a bit line associated with a desired portion of the register file based on the bit mask 446.

In a particular illustrative embodiment, the execution units 408, 410, 430 and 432 include zero detection logic circuitry that can be used to identify the blocks of bits having zero values. In another particular embodiment, the control logic circuit 440 is adapted to detect zero value blocks of bits and to control read/write operations from and to the register files 436 and 438 to selectively access portions of the register files 436 and 438.

Figure 5:
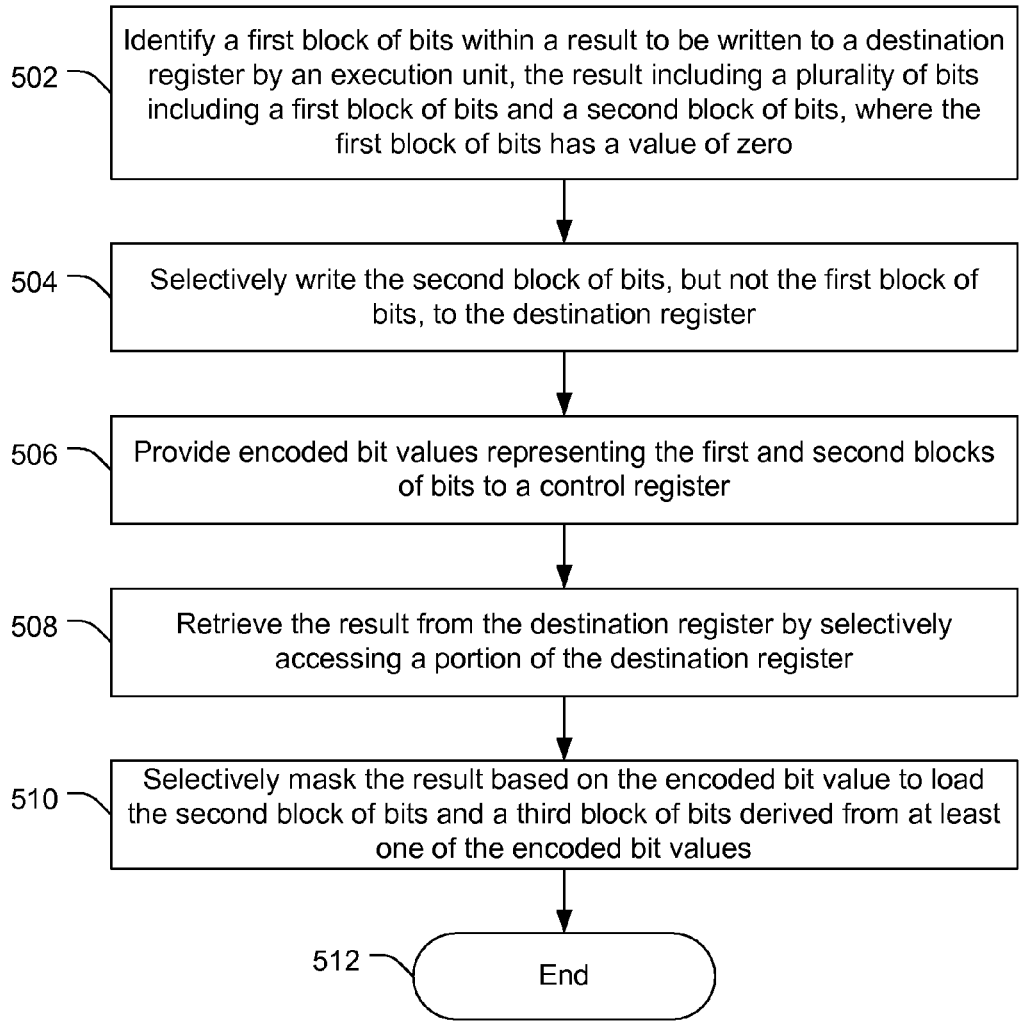
FIG. 5 is a flow diagram of a particular illustrative embodiment of a method of selectively accessing a destination register.

FIG. 5 is a flow diagram of a particular illustrative embodiment of a method of selectively accessing a destination register. At 502, a first block of bits within a result to be written to a destination register by an execution unit is identified, where the result includes a plurality of bits including a first block of bits and a second block of bits and where the first block of bits has a value of zero. Advancing to 504, the method includes selectively writing the second block of bits, but not the first block of bits, to the destination register. In a particular example, selectively writing the second block of bits may include toggling a second write enable line associated with the destination register to latch data into a second portion of the destination register without toggling a first write enable line associated with a first portion the destination register.

Moving to 506, encoded bit values are provided to a control register, where the encoded bit values represent the first and second blocks of bits. Continuing to 508, the result is retrieved from the destination register by selectively accessing a portion of the destination register corresponding to the second block of bits. Proceeding to 510, the method includes selectively masking the result based on the encoded bit value to load the second block of bits and to load a third block of bits derived from at least one of the encoded bit values. The method terminates at 512.

In a particular example, the method may also include selectively loading the second block of bits from the destination register to the execution unit based on the encoded bit value from the control register and providing a third block of bits having a value of zero to the execution unit in place of the first block of bits. The third block of bits may be provided by multiplexing a zero value in lieu of data retrieved from a portion of the register file. In a particular embodiment, a zero value from a bit of the bit mask may be multiplied by data retrieved from a destination register to provide the third block of bits. In a particular instance, the third block of bits may equal the first block of bits. In another particular example, the method may also include masking a portion of the destination register corresponding to the first block of bits with zero bits using the encoded bit value from the control register.

In an particular example, the destination register may be selectively accessed (at 508, for example) by selectively activating a register read enable line associated with a portion of the destination register containing the second block of bits. In a particular embodiment, the first block of bits includes 16-bits of data and the second block of bits includes 16-bits of data. In still another particular embodiment, the first block of bits includes 8-bits and the second block of bits includes 8-bits, and the result includes third and fourth blocks of bits including 8-bits each.

Figure 6:
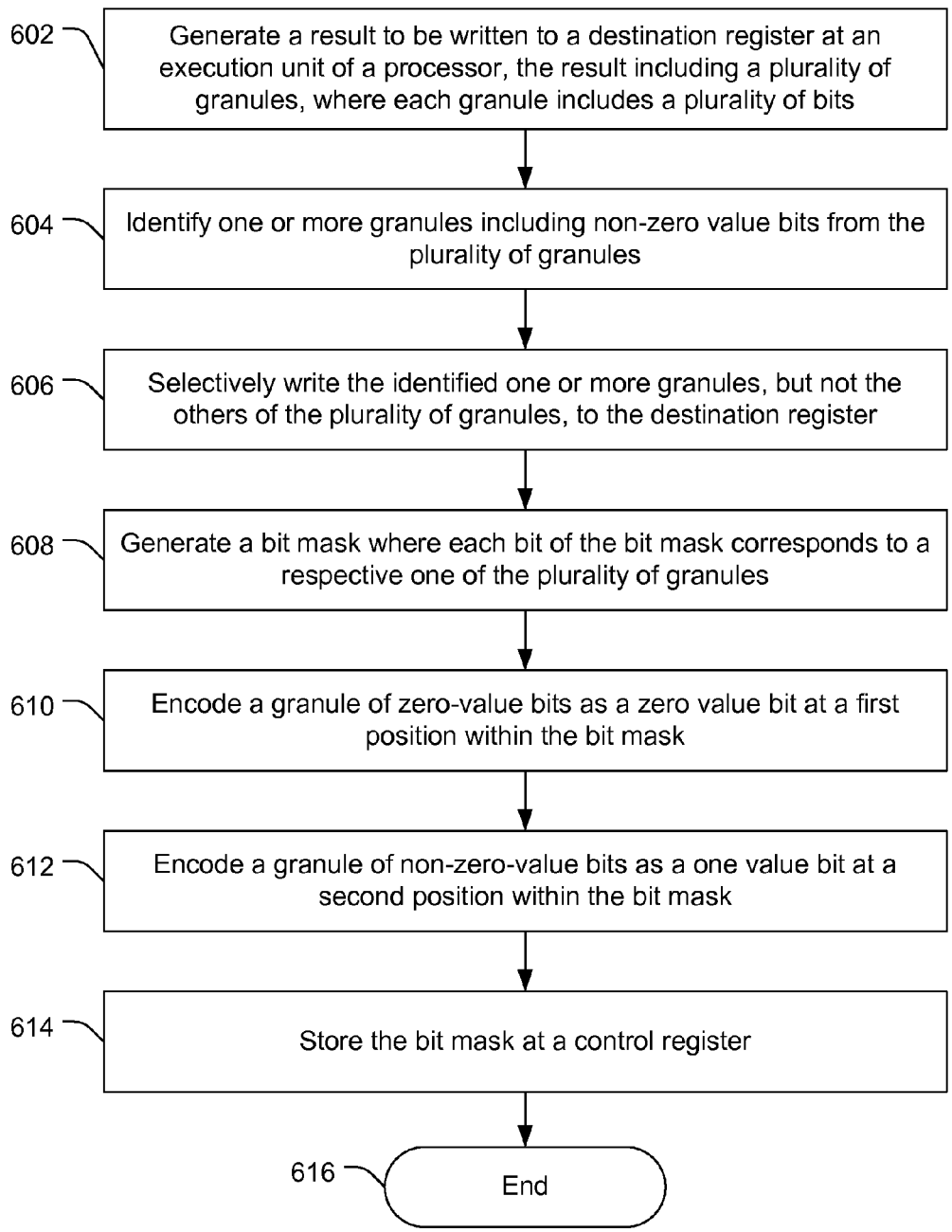
FIG. 6 is a flow diagram of a second particular illustrative embodiment of a method of accessing a destination register.

FIG. 6 is a flow diagram of a second particular illustrative embodiment of a method of accessing a destination register. At 602, a result to be written to a destination register is generated at an execution unit of a processor, where the result includes a plurality of granules and where each granule includes a plurality of bits. Advancing to 604, one or more granules including non-zero value bits are identified from the plurality of granules. Continuing to 606, the method includes selectively writing the identified one or more granules, but not the others of the plurality of granules, to the destination register. In a particular embodiment, selectively writing the identified one or more granules includes selectively toggling a write line associated with a portion of the destination register corresponding to the identified one or more granules. In a particular example, power is conserved by not toggling other write lines associated with other portions of the destination register.

Moving to 608, a bit mask is generated where each bit of the bit mask corresponds to a respective one of the plurality of granules. Proceeding to 610, a granule of zero value bits is encoded as a zero value bit at a first position within the bit mask. Continuing to 612, a granule that includes non-zero value bits is encoded as a one value bit at a second position within the bit mask. Moving to 614, the bit mask is stored at a control register. The method terminates at 616.

In a particular embodiment, the method can include generating a bit mask, where each bit within the bit mask corresponds to a respective one of the plurality of granules. The granule of zero-value bits can be encoded as a zero bit within a respective position of the bit mask and a granule of non-zero value bits can be encoded within a second respective position of the bit mask.

In a particular example, the method includes activating a read line associated with the destination register to read data from the destination register and selectively clocking a first latch circuit to latch a first portion of the data based on the bit mask, a second latch circuit to latch a second portion of the data based on the bit mask, or any combination thereof. In a particular embodiment, a method may also include selectively providing data from the first latch circuit and the latch circuit to the execution unit.

Figure 7:
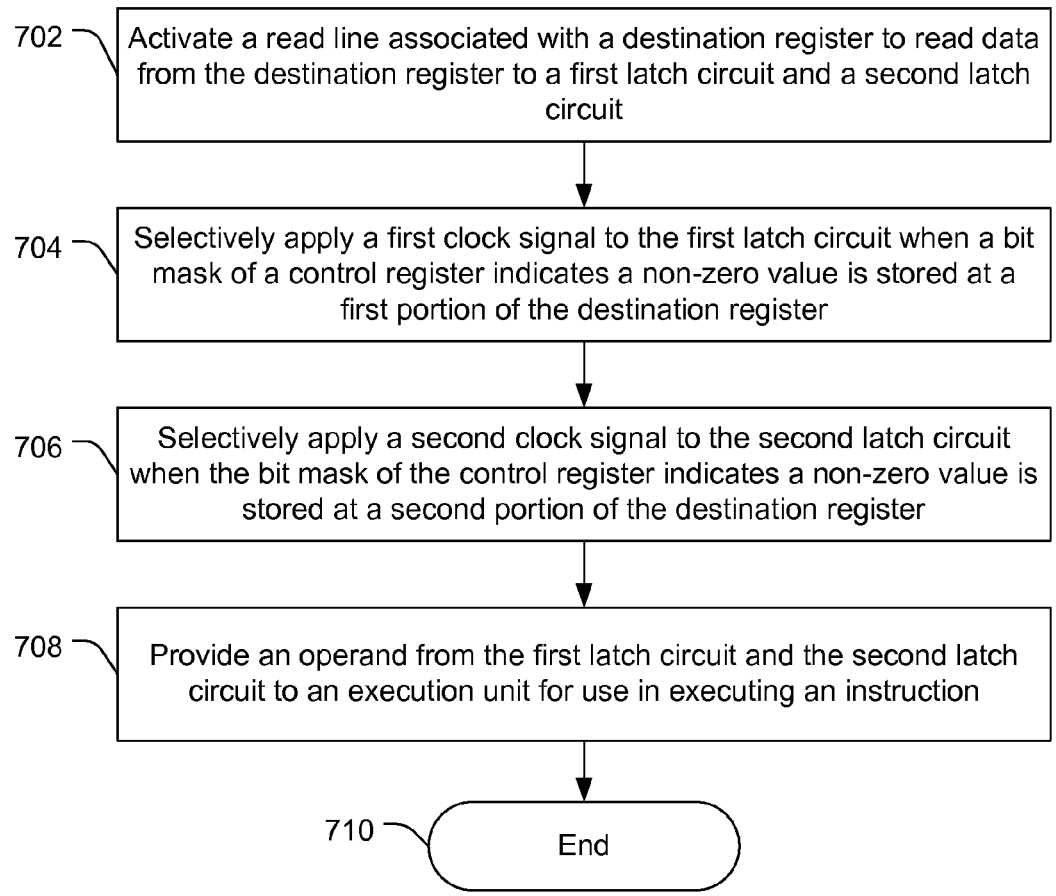
FIG. 7 is a flow diagram of a particular illustrative embodiment of a method of selectively reading data from a destination register.

FIG. 7 is a flow diagram of a particular illustrative embodiment of a method of selectively reading data from a destination register. At 702, a read line associated with a destination register is activated to read data from the destination register to a first latch circuit and a second latch circuit. Advancing to 704, a first clock signal is selectively applied to the first latch circuit when a bit mask of a control register indicates a non-zero value is stored at a first portion of the destination register. Continuing to 706, a second clock signal is applied to a second latch circuit when the bit mask of the control register indicates that a non-zero value is stored at a second portion of the destination register. Proceeding to 708, an operand is provided from the first and second latch circuits to an execution unit for use in executing an instruction. The method terminates at 710.

In an alternative embodiment, separate read lines and separate write lines may be provided within the general register to provide a granular control to selectively read data to a first portion of a destination register (such as a most significant bit portion, e.g., a most significant 8-bit portion or a most significant 16-bit portion of a 32-bit destination register). In particular, upper and lower portions of a destination register may be read or written by selectively activating a first or second read line or a first or second write line. In a particular example, a thirty-two bit destination register may be accessible by activating a first read line associated with an upper 16-bits of the destination register and a second read line associated with a lower 16-bits of the destination register.

Figure 8:
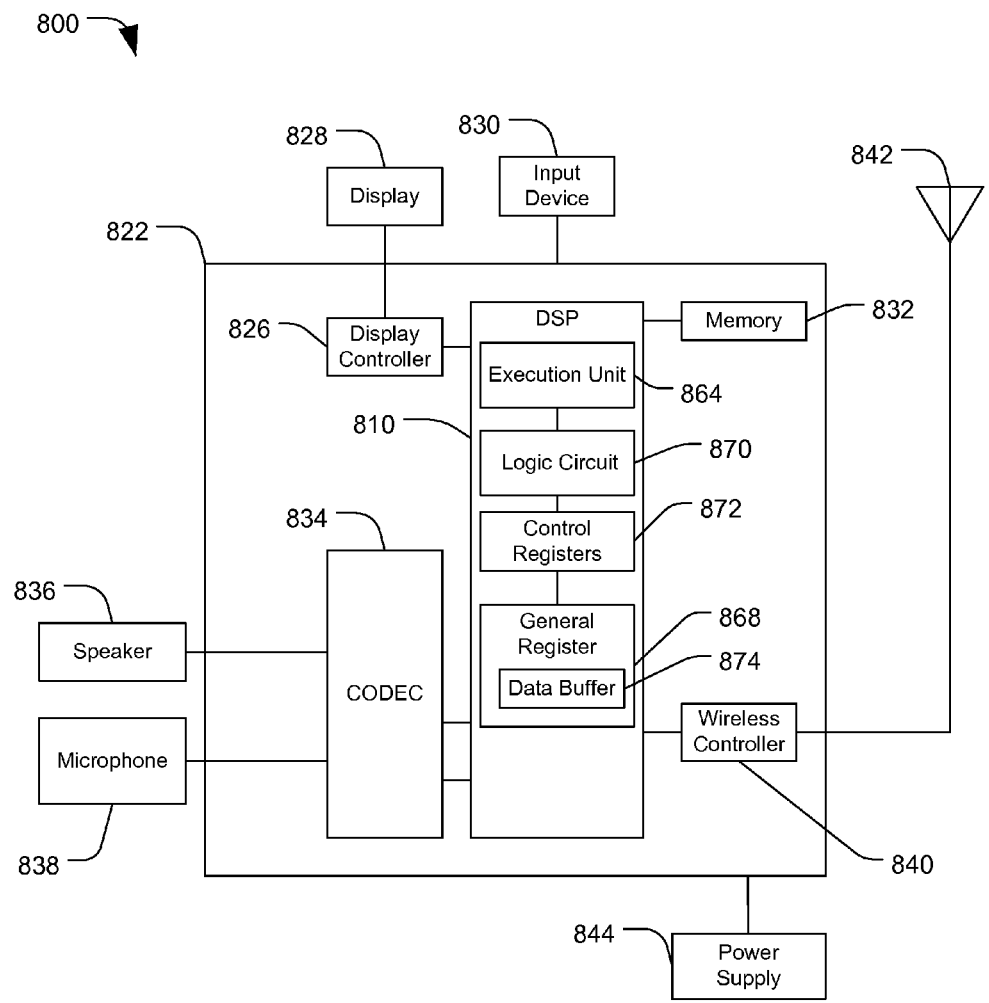
FIG. 8 is a block diagram of an illustrative embodiment of a communications device including circuitry adapted to selectively access a destination register.

FIG. 8 is a block diagram of an illustrative embodiment of a communications device 800 including circuitry adapted to selectively access a destination register. The wireless communications device 800 includes a processor 810, such as a digital signal processor (DSP), having an execution unit 864, a general register 868, a logic circuit 870, control registers 872, and a data buffer 874. The logic circuit 870 is adapted to selectively control access to the general register 868. In a particular embodiment, the logic circuit 870 is adapted to prevent write operations to the general register 868 when the data to be written has a value of zero. The logic circuit 870 is adapted to encode a mask associated with the data to be written to the control registers 872 and to selectively write data to a destination register of the general registers 868. In a particular example, the logic circuit 870 is adapted to selectively toggle write lines and read lines associated with the general register 868 to write non-zero values and to skip a write operation related to zero values. In a particular example, the logic circuit 870 may also access the general register 868 to selectively read data from the general register 868. In a particular example, the logic circuit 870 is adapted to control the data buffer 874 to selectively latch non-zero value blocks of data bits, but not zero value blocks of data bits, into the data buffer 874. In a particular embodiment, the logic circuit 870 corresponds to the logic circuit 142 and the control unit 132 illustrated in FIG. 1. In another particular embodiment, the logic circuit 870 may correspond to zero detection logic circuit 220 the latch control logic circuit 236 illustrated in FIG. 2, the zero detection logic circuit 320 and the read/write selection control circuit 322 illustrated in FIG. 3, the control unit 406 illustrated in FIG. 4, or any combination thereof.

The wireless communications device 800 can include a digital signal processor (DSP) 810 that has an execution unit 864 with associated logic circuitry 870. The logic circuitry 870 is operable to selectively access the general register 868 to write non-zero blocks of data and to read non-zero blocks of data. The logic circuit 870 is also operable to store a mask that represents an encoded version of the data including zero value blocks of data and non-zero blocks of data and to utilize the stored mask to selectively retrieve data stored at the general register 868, as described with respect to FIGS. 1-7. The wireless communications device 800 also includes a memory 832 that is accessible to the DSP 810.

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the digital signal processor 810 and to a wireless antenna 842. In a particular embodiment, an input device 830 and a power supply 844 are coupled to the on-chip system 822. Moreover, in a particular embodiment, as illustrated in FIG. 8, the display 828, the input device 830, the speaker 836, the microphone 838, the wireless antenna 842, and the power supply 844 are external to the on-chip system 822. However, each can be coupled to a component of the on-chip system 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   identifying a first block of bits within a result to be written to a destination register by an execution unit, the result comprising a plurality of bits including the first block of bits and a second block of bits, the first block of bits having a zero value corresponding to a first portion of the destination register and the second block of bits having a non-zero value corresponding to a second portion of the destination register;
   selectively writing the second block of bits to the second portion of the destination register without writing the first block of bits to the first portion of the destination register irrespective of a value stored in the first portion of the destination register;
   providing a first encoded bit value to a control register, the first encoded bit value indicating that the first block of bits has the zero value;
   providing a second encoded bit value to the control register, the second bit value indicating that the second block of bits has the non-zero value;
   maintaining a first register read enable line inactive based on the first encoded bit value, wherein the first register read enable line is associated with the first portion of the destination register;
   selectively loading the second block of bits from the second portion of the destination register to the execution unit based on the second encoded bit value by selectively activating a second register read enable line associated with the second portion of the destination register based on the second encoded bit value; and
   providing a third block of bits having a value of zero to the execution unit in place of the value stored in the first portion of the destination register.

2. The method of claim 1, further comprising:
   masking the first portion of the destination register with zero bits using the first encoded bit value from the control register to provide the third block of bits to the execution unit.

3. The method of claim 1, wherein selectively writing the second block of bits to the second portion of the destination register further comprises toggling a second write enable line associated with the second portion of the destination register to latch data into the second portion of the destination register based on the second encoded bit value, without toggling a first write enable line associated with the first portion of the destination register based on the first encoded bit value.

4. The method of claim 1, wherein the value stored in the first portion of the destination register remains unchanged by the first block of bits.

5. The method of claim 4, wherein the value stored in the first portion of the destination register has a non-zero value.

6. The method of claim 1, wherein the first block of bits having the zero value is in a less significant position in the result than the second block of bits having the non-zero value.

7. The method of claim 1, wherein providing the third block of bits having the value of zero to the execution unit comprises ANDing the value stored in the first portion of the destination register with the first encoded bit value, wherein the first encoded bit value is a zero bit value.

8. The method of claim 1, wherein providing the third block of bits having the value of zero to the execution unit comprises multiplying the value stored in the first portion of the destination register by the first encoded bit value, wherein the first encoded bit value is a zero bit value.

9. The method of claim 1, further comprising:
   maintaining a first register read enable line inactive based on the first encoded bit value, wherein the first register read enable line is associated with the first portion of the destination register, and wherein selectively loading the second block of bits further comprises selectively activating a second register read enable line associated with the second portion of the destination register based on the second encoded bit value.

10. A circuit device comprising:
    an execution unit to process instructions and to generate a result comprising a plurality of bits, wherein the plurality of bits includes a first block of bits having a zero value and a second block of bits having a non-zero value;

a destination register to store selected bits of the plurality of bits, the first block of bits corresponding to a first portion of the destination register and the second block of bits corresponding to a second portion of the destination register; and a logic circuit having access to the execution unit and to the destination register, the logic circuit operative to receive the result from the execution unit and to selectively write the second block of bits to the second portion of the destination register and to not write the first block of bits to the first portion of the destination register irrespective of a value stored in the first portion of the destination register, the logic circuit further operative to generate a first encoded bit value indicating that the first block of bits has the zero value, and to generate a second encoded bit value indicating that the second block of bits of the second portion of the destination register has the non-zero value;

wherein the destination register includes a first read enable line associated with the first portion of the destination register to selectively access data at the first portion of the destination register and includes a second read enable line associated with the second portion of the destination register to selectively read data from the second portion of the destination register, wherein the logic circuit is operative to use the first encoded bit value to deactivate the first read enable line and to use the second encoded bit value to selectively activate the second read enable line.

11. The circuit device of claim 10, wherein the logic circuit is operative to retrieve the first and second encoded bit values from the control register and to selectively read the second block of bits from the second portion of the destination register based on the stored second encoded bit value, the logic circuit operative to mask the first portion of the destination register with zero bits based on the stored first encoded bit value.

12. The circuit device of claim 10, further comprising a register file buffer responsive to the logic circuit to selectively latch the second block of bits read from the second portion of the destination register and to ignore the value stored in the first portion of the destination register based on the stored first encoded bit value.

13. The circuit device of claim 10, wherein the destination register includes a first write enable line associated with the first portion of the destination register to selectively latch data into the first portion of the destination register and a second write enable line associated with the second portion of the destination register to selectively latch data into the second portion of the destination register, wherein the logic circuit is operative to use the first encoded bit value to deactivate the first write enable line and to use the second encoded bit value to selectively activate the second write enable line.

14. The circuit device of claim 10, wherein the value stored in the first portion of the destination register remains unchanged by the first block of bits, the value stored in the first portion of the destination register having a non-zero value.

15. The circuit device of claim 10, wherein the first block of bits having the zero value is in a less significant position in the result than the second block of bits having the non-zero value.

16. The circuit device of claim 10, wherein the first encoded bit value has a zero value, wherein the logic circuit is further operative to AND the first encoded bit value with the value stored in the first portion of the destination register to provide a third block of bits to the execution unit.

17. A method comprising:
generating a result to be written to a destination register at an execution unit of a processor, the result comprising a plurality of granules, each granule of the plurality of granules comprising a plurality of bits;
identifying a first set of one or more granules comprising non-zero value bits and a second set of one or more granules comprising zero value bits from the plurality of granules;
selectively writing the identified first set of one or more granules to the destination register without writing the identified second set of one or more granules to the destination register irrespective of values stored in portions of the destination register corresponding to the identified second set of one or more granules;
generating a bit mask, each bit within the bit mask corresponding to a respective one of the plurality of granules;
encoding the second set of one or more granules as zero value bits within the bit mask;
encoding the first set of one or more granules as one value bits within the bit mask;
activating a read line associated with the destination register to read data from the destination register;
selectively clocking a first latch circuit to latch a first portion of the data based on the bit mask; and
selectively clocking a second latch circuit to latch a second portion of the data based on the bit mask.

18. The method of claim 17, wherein selectively writing the identified first set of one or more granules, without writing the identified second set of one or more granules comprises selectively enabling a first write line associated with a first portion of the destination register corresponding to the identified first set of one or more granules and deactivating a second write enabled line associated with a second portion of the destination register corresponding to the identified second set of one or more granules.

19. A processor comprising:
means for identifying a first block of bits within a result to be written to a destination register by an execution unit, the result comprising a plurality of bits including the first block of bits and a second block of bits, the first block of bits having a zero value corresponding to a first portion of the destination register and the second block of bits having a non-zero value corresponding to a second portion of the destination register;
means for providing a first encoded bit value representing the first block of bits and a second encoded bit value representing the second block of bits to a control register;
means for selectively writing the second block of bits to the second portion of the destination register without writing the first block of bits to the first portion of the destination register irrespective of a value stored in the first portion of the destination register;
means for selectively loading the second block of bits from the second portion of the destination register to the execution unit based on the second encoded bit value from the control register;
means for providing a third block of bits having a value of zero to the execution unit in place of the value stored in the first portion of the destination register; and
means for selectively activating a register read enable line associated with the second portion of the destination register containing the second block of bits.

20. The processor of claim 19, further comprising means for masking the first portion of the destination register with zero bits using the first encoded bit value from the control register to provide the third block of bits to the execution unit.

21. The method of claim 17, wherein the values stored in the portions of the destination register corresponding to the identified second set of one or more granules remain unchanged by the first set of one or more granules, the values stored in the portions of the destination register having a non-zero value.

* * * * *